United States Patent Office 3,426,251
Patented Feb. 4, 1969

3,426,251
DONOR-ACCEPTOR ION-MODIFIED BARIUM
TITANATE CAPACITOR AND PROCESS
Thomas I. Prokopowicz, North Adams, Mass., assignor to Sprague Electric Company, North Adams, Mass., a corporation of Massachusetts
Filed Aug. 1, 1966, Ser. No. 569,309
U.S. Cl. 317—230          5 Claims
Int. Cl. H01g 9/00, 13/00, 1/00

ABSTRACT OF THE DISCLOSURE

A ceramic capacitor has a thick semiconducting zone and a thin dielectric zone adjacent at least one side thereof. The thick zone is barium titanate containing a semiconductivity-imparting-proportion of a donor ion. The thin zone is a surface region on the semiconducting zone containing in addition to said donor ion, a compensating, nonconductivity-imparting-proportion of an acceptor ion. An electrode is affixed to said dielectric zone. The method of preparing the capacitor involves adding the semiconductivity-imparting-proportions of the donor and acceptor ions to the barium titanate, firing to maturity and applying the electrode to the fired body.

---

This invention relates to a ceramic capacitor and a process for forming ceramic capacitors, and in particular refers to the preparation of comparatively physically thick ceramic capacitors having comparatively thin dielectric layers.

A prior art process yielding a physically thick ceramic capacitor having extremely thin dielectric layers comprises the following steps: (a) forming a dielectric titanate body by sintering a compacted titanate powder in air at a temperature of about 2450° F., (b) converting the nonporous dielectric body to a semiconducting body by firing it in a reducing atmosphere, e.g., carbon monoxide, hydrogen or inert atmosphere not containing oxygen, at a temperature between about 2100–2300° F., (c) applying silver electrodes to opposite sides of the reduced body and firing the unit in an oxidizing atmosphere, e.g., air or oxygen, to reoxidize the surface of the body beneath the electrodes. The resulting structure defines a pair of capacitors, series-connected by the semiconducting zone of the ceramic body.

This process has certain inherent disadvantages. Three separate firings are required, initial sintering, reduction and reoxidation, all requiring close control. The conductivity of the titanate increases gradually with its state of reduction (oxygen deficiency). Thus, the transition from conducting to insulating titanate in the capacitor is a gradual one, to the detriment of the dissipation factor and the temperature and frequency dependence of capacitance. Moreover, various additives to the titanate may result in the presence of separate phases whose oxidation-reduction kinetics and equilibria differ from those of the matrix.

It is an object of this invention to overcome the foregoing disadvantages of the prior art and other disadvantages which directly or indirectly result therefrom.

A further object of this invention is to produce a ceramic capacitor which possesses the advantages of the prior art capacitors without at the same time being subject to their disadvantages.

A still further object is to produce a ceramic capacitor body which has at least one extremely thin dielectric layer in intimate contact with at least one comparatively thick semiconductive layer.

Yet another object is to produce a ceramic capacitor the dielectric layer or layers of which can either be confined to any specific pattern or cover the whole of the surface of the ceramic.

These and other objects of this invention will become apparent upon consideration of the following description taken together with the accompanying drawings in which.

Figure 1:
FIGURE 1 is a cross section view of an unfired disc containing a semiconductivity-imparting-proportion of donor ion.

The ceramic capacitor in accordance with the present invention comprises a barium titanate body consisting of a comparatively thick semiconducting zone having a comparatively thin dielectric zone adjacent at least one side thereof. The semiconducting zone consists essentially of barium titanate containing (1) a semiconductivity-imparting-proportion of a donor ion, said ion being a member of the group consisting of pentavalent and hexavalent cations having an ionic radius of between about 0.5–0.8 A.; trivalent and tetravalent cations having an ionic radius of between about 0.9–1.6 A. and divalent, trivalent, tetravalent and penta-valent cations having an ionic radius of between about 0.15–0.4 A. The dielectric zone consists essentially of barium titanate containing (1) and in addition (2) a compensating, nonconductivity-imparting-proportion of an acceptor ion, said acceptor ion being a member of the group consisting of monovalent cations having an ionic radius of between about 0.65–1.7 A. and divalent and trivalent cations having an ionic radius of between 0.5–0.8 A. An electrode is affixed to each dielectric zone when there are two or more such zones. In the simple arrangement of a single dielectric zone and a single semiconducting zone, an electrode is affixed to each zone. Various other electrode, dielectric and semiconducting zone combinations will be apparent to one skilled in the art.

The present invention is based upon the following: donor impurities in barium titanate may be defined as ions which have a higher positive valence than the normal ion which they replace in the lattice, hence $Nb^{+5}$ or $W^{+6}$ on a $Ti^{+4}$ site or $La^{+3}$ on a $Ba^{+2}$ site. Each donor ion contributes one charge carrier (electron) if it is a single-level donor, i.e., if its valence is one unit higher than that of the ion it replaces ($Nb^{+5}$ for $Ti^{+4}$); or up to two charge carriers if it is a two-level donor, i.e, if its valence is two units higher than that of the ion it replaces ($W^{+6}$ for $Ti^{+4}$). These charge carriers are essentially free and lead to increasing conductivity with increasing donor concentration up to about a few tenths of a percent. Further addition of the donor causes an abrupt reversal back to an insulating material. It has been determined that another way to convert the ceramic back to an insulating material is by the addition of certain specified acceptor ions. Donor impurities may also be positive ions of any valence, having ion radii small enough to fit interstitially in the barium titanate lattice. Examples of such small positive ions are $Be^{+2}$, $B^{+3}$, $C^{+4}$ and $P^{+5}$. The radius of the ions is in the range of 0.15–0.4 A.

Acceptor impurities in barium titanate may be defined as ions which have a lower positive valence than the normal ion which they replace in the lattice, hence $Al^{+3}$ or $Ni^{+2}$ on a $Ti^{+4}$ site or $K^{+1}$ on a $Ba^{+2}$ site. Single and two level acceptors are defined in the same way as donors. $Al^{+3}$ is a single-level acceptor and $Ni^{+2}$ is a double-level acceptor. Acceptor-doping, however, does not lead to significant conduction at ordinary temperatures. Apparently, the energy required to ionize an electron from a valence band to acceptor level, thus creating a free hole, is substantially higher than the energy necessary to ionize a donor to give a free electron. An acceptor does, however, represent an empty energy level below the donor level so that electrons from donors will drop into any available acceptor level and thus no longer contribute to conduction. Thus a single-level acceptor will compensate for a single-level donor on a one-to-one atomic basis, or each two level ion will compensate for two single-level donor ions. As aceptor ion is added to a conducting, donor-doped barium titanate, the conductivity will gradually decrease until complete compensation has occurred at which point the material should be about as good an insulator as pure barium titanate. Even if more acceptor is added, the conductivity remains low since acceptor by itself does not cause conduction. The amount of acceptor added is not important as long as enough is present to compensate for the donor concentration. This is important because it makes it unnecessary to hit the point of exact compensation; no harm is done by overshooting by a substantial proportion.

The transition is usually accompanied by a color change from black or blue black (conducting) due to formation of $Ti^{+3}$ ions, to some other color which may be white, yellow, red, etc., depending upon the acceptor ion employed to impart insulating characteristics to the ceramic. The maximum conductivity via donor doping is about the same as can be obtained by reducing barium titanate in an oxygen deficient atmosphere, such as CO or $H_2$, and the dielectric constant of the acceptor compensated ceramic is about as high as undoped barium titanate ceramic.

Figure 2:
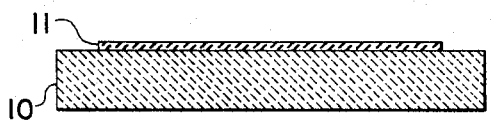
FIGURE 2 is a cross section view of the unfired disc of FIGURE 1 having a source of acceptor ion deposited on the surface thereof.
Figure 3:
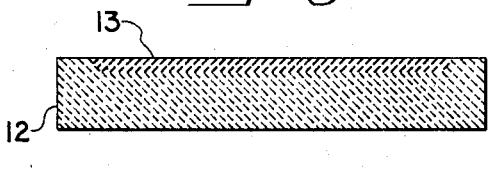
FIGURE 3 shows a cross section of the disc of FIGURE 2 after said disc has been fired to maturity.
Figure 4:
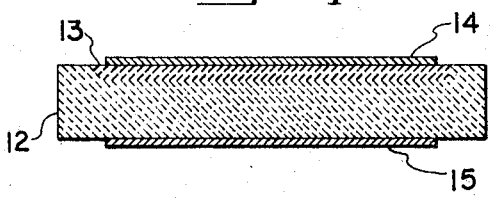
FIGURE 4 shows a cross section of the unit of FIGURE 3 electroded to form a capacitor.

Referring to the drawings, FIGURE 1 shows an unfired disc 10 containing a semiconductivity-imparting-proportion of an appropriate donor ion; FIGURE 2 shows a surface layer 11 of a nonconductivity-imparting-proportion of an aceptor ion applied to disc 10. FIGURE 3 shows the disc of FIGURE 2 after it has been fired to the ceramic state. The disc then consists of a comparatively thick semiconducting zone 12 and a comparatively thin dielectric zone 13 as a surface region thereon. FIGURE 4 shows electrodes 14 and 15 applied to the unit of FIGURE 3.

The invention is illustrated by the following examples.

EXAMPLE I

Powdered barium titanate was compounded so as to contain 0.00125 mole percent of $Nb_2O_5$. A pellet 0.5 inch in diameter and 0.025 inch thick was fired to maturity at a temperature of about 1350° C. This disc had a resistivity of about 100 ohm-cm. at 25° C. One surface of this pellet was covered with a thin film of nickel (about 1000 A.) by evaporation. This unit was fired in air at a temperature of about 1100° C. for a period of about two hours. The layer of nickel was converted to nickel oxide during the heat treatment process and indiffused into the semiconducting ceramic disc to form a dielectric surface region thereon. The dielectric region had a dielectric constant of about 1500. Electrodes of silver were fired on opposite surfaces of the disc.

The capacitance of the unit of the foregoing example was about 0.1 $\mu f./in.^2$ and the dissipation factor was about 8%.

EXAMPLE II

Powdered barium titanate was compounded so as to contain 0.00125 mole percent $Nb_2O_5$. Four unfired pellets 0.5 inch in diameter and 0.025 inch thick were prepared and one surface of each pellet was covered with a layer of $Fe_2O_3$ of about 0.1 micron thick. These units were then fired at a temperature of about 1350° C. for a period of about two hours. This produced dielectric layers of about 0.001 inch thick in the surface region of the pellets. Silver electrodes were fired onto opposite surfaces of the pellets. The dielectric constant of the dielectric layers averaged about 1500. The units had an average dissipation factor of about 3–4%. The resistivity of the semiconductive zone of the units averaged about 100 ohm-cm.

The donor ion can be introduced into the barium titanate in any manner. For example, instead of employing the pure element or its oxide, which would be oxidized during sintering, it may be more practical to introduce donor ion via an organic compound containing the ion. The same is also true of the acceptor ion. Certain organometallic compositions, for example, niobium resinate, tantalum resinate, nickel resinate, etc., are commercially available. Compositions of this type can be employed to introduce the appropriate donor and/or acceptor ion into the titanate body in the form of the metal oxide. In the case of the acceptor ion, this would be accomplished by dissolving the organometallic composition in an appropriate solvent until the proper concentration is obtained. This composition would then be applied to the surface of the titanate piece, for example, by silk screening. Thereafter, the solvent would be evaporated and during the firing of the titanate piece the organometallic compound would be decomposed to the metal oxide which will go into solid solution with the titanate. A further example of introducing the donor and/or the acceptor into the ceramic is by gaseous diffusion techniques.

As employed herein, a donor ion is an ion which results in bringing about N-type electrical conductivity in barium titanate as determined by Seebeck or Hall measurements. Examples of donor ions which will substitute for some of the titanium in the barium titanate lattice are: $Nb^{+5}$, $Ta^{+5}$, $V^{+5}$, $Sb^{+5}$, $W^{+6}$ and $U^{+6}$. Examples of donor ions which will substitute for part of the barium in the barium titanate lattice are $La^{+3}$, the rare earth ions and $Th^{+4}$, $Pa^{+3}$, $Pa^{+4}$ and $U^{+4}$. An example of a donor ion which will substitute for part of the oxygen in the barium titanate lattice is the $F^-$ ion. Certain ions, in proper concentration may act as donors by virtue of their occupying interstitial positions in the barium titanate lattice instead of direct substitution for $Ba^{+2}$, $Ti^{+4}$ or $O^{-2}$. Examples of such ions are $B^{+3}$, $Be^{+2}$, $C^{+4}$ and $P^{+5}$.

As employed herein, an acceptor ion is an ion which results in bringing about P-type electrical conductivity in barium titanate as determined by Seebeck or Hall measurements. Examples of acceptor ions are $Fe^{+3}$, $Ni^{+2}$, $Mg^{+2}$, $Co^{+3}$, $Na^{+1}$, $Ag^{+1}$, $Li^{+1}$, $Al^{+3}$, $Cn^{+1}$, $Cu^{+2}$ and $K^{+1}$.

It is to be understood that mixtures of appropriate ions can be employed instead of just single ions. The exact proportion of donor ion and acceptor ion that should be added as the semiconductivity-imparting-proportion and the nonconductivity-imparting-proportion will vary depending upon the particular ions introduced. One skilled in the art can easily determine the optimum proportion by observation of the color change of the unit as proportions are varied and also by electrical measurements. While the specific examples have illustrated the formation of capacitors having only a single dielectric layer, it should be understood that the units could have a dielectric layer on opposite sides thereof. Moreover, multilayer units can be formed either by making a successive build-up of semiconductor, dielectric, metal electrode or by bonding together two or more individual units. The electrode metal can be any capacitor electrode material known to the art.

Since it is obvious that many changes and modifications can be made in the above-described details without departing from the nature and spirit of the invention, it is to be understood that the invention is not limited to said details except as set forth in the appended claims.

What is claimed is:

1. A ceramic capacitor comprising a barium titanate body consisting essentially of a comparatively thick semiconducting zone having a comparatively thin dielectric zone adjacent at least one side thereof, said semiconducting zone consisting essentially of barium titanate containing (1) a semiconductivity-imparting-proportion of a donor ion; said ion being a member of the group consisting of pentavalent and hexavalent cations having an ionic radius of between about 0.5–0.8 A.; trivalent and tetravalent cations having an ionic radius of between about 0.9–1.6 A.; and divalent, trivalent, tetravalent and pentavalent cations having an ionic radius of between about 0.15–0.4 A.; said dielectric zone consisting essentially of barium titanate containing said semiconductivity-imparting-proportion of a donor ion and in addition (2) a compensating, nonconductivity-imparting-proportion of an acceptor ion, said acceptor ion being a member of the group consisting of monovalent cations having an ionic radius of between about 0.65–1.7 A. and divalent and trivalent cations having an ionic radius of between about 0.5–0.8 A.; and an electrode affixed to said dielectric zone.

2. The capacitor of claim 1 wherein said donor ion is a member of the group consisting of $Th^{+4}$, $Pa^{+3}$, $Pa^{+4}$, $U^{+4}$, $Nb^{+5}$, $Ta^{+5}$, $V^{+5}$, $Sb^{+5}$, $W^{+6}$, $U^{+6}$, $La^{+3}$, and the rare earth ions, $F^-$, $B^{+3}$, $Be^{+2}$, $C^{+4}$ and $P^{+5}$ and wherein the acceptor ion is a member of the group consisting of $Fe^{+3}$, $Ni^{+2}$, $Mg^{+2}$, $Co^{+3}$, $Na^{+1}$, $Ag^{+1}$, $Li^{+1}$, $Cu^{+1}$, $Cu^{+2}$, $Al^{+3}$, and $K^{+1}$.

3. A process for forming a ceramic capacitor comprising uniformly mixing a semiconductivity-imparting-proportion of a donor ion to unfired barium titanate powder, said donor ion being a member of the group consisting of pentavalent and hexavalent cations having an ionic radius of between about 0.5–0.8 A.; trivalent and tetravalent cations having an ionic radius of about 0.9–1.6 A. and divalent, trivalent, tetravalent and pentavalent cations having an ionic radius of between about 0.15–0.4 A.; compacting said barium titanate into a coherent body, applying to at least one surface of said body a nonconductivity-imparting-proportion of an acceptor ion, said acceptor ion being a member of the group consisting of monovalent cations having an ionic radius of between about from 0.65–1.7 A. and divalent and trivalent cations having an ionic radius of between about 0.5–0.8 A.; firing said body to maturity in an oxygen containing atmosphere to form a ceramic body consisting of a comparatively thick semiconducting zone having a comparatively thin dielectric zone adjacent at least one side thereof; and applying an electrode to each nonconductive surface.

4. The process of claim 3 wherein said donor ion is $Nb^{+5}$ and said acceptor ion is $Ni^{+2}$.

5. The process of claim 3 wherein the donor ion is $Nb^{+5}$ and said acceptor ion is $Fe^{+3}$.

References Cited

UNITED STATES PATENTS

| | | | |
|---|---|---|---|
| 2,962,452 | 11/1960 | Counts et al. | 252—520 |
| 3,033,907 | 5/1962 | Rue | 252—520 |
| 3,036,018 | 5/1962 | Peras | 252—520 |
| 3,268,783 | 8/1966 | Saburi | 317—230 |
| 3,274,467 | 9/1966 | Graf | 317—258 |
| 3,340,074 | 9/1967 | Herczog | 317—258 |

JAMES D. KALLAM, *Primary Examiner.*

U.S. Cl. X.R.

252—520; 317—258